Patented Apr. 7, 1942

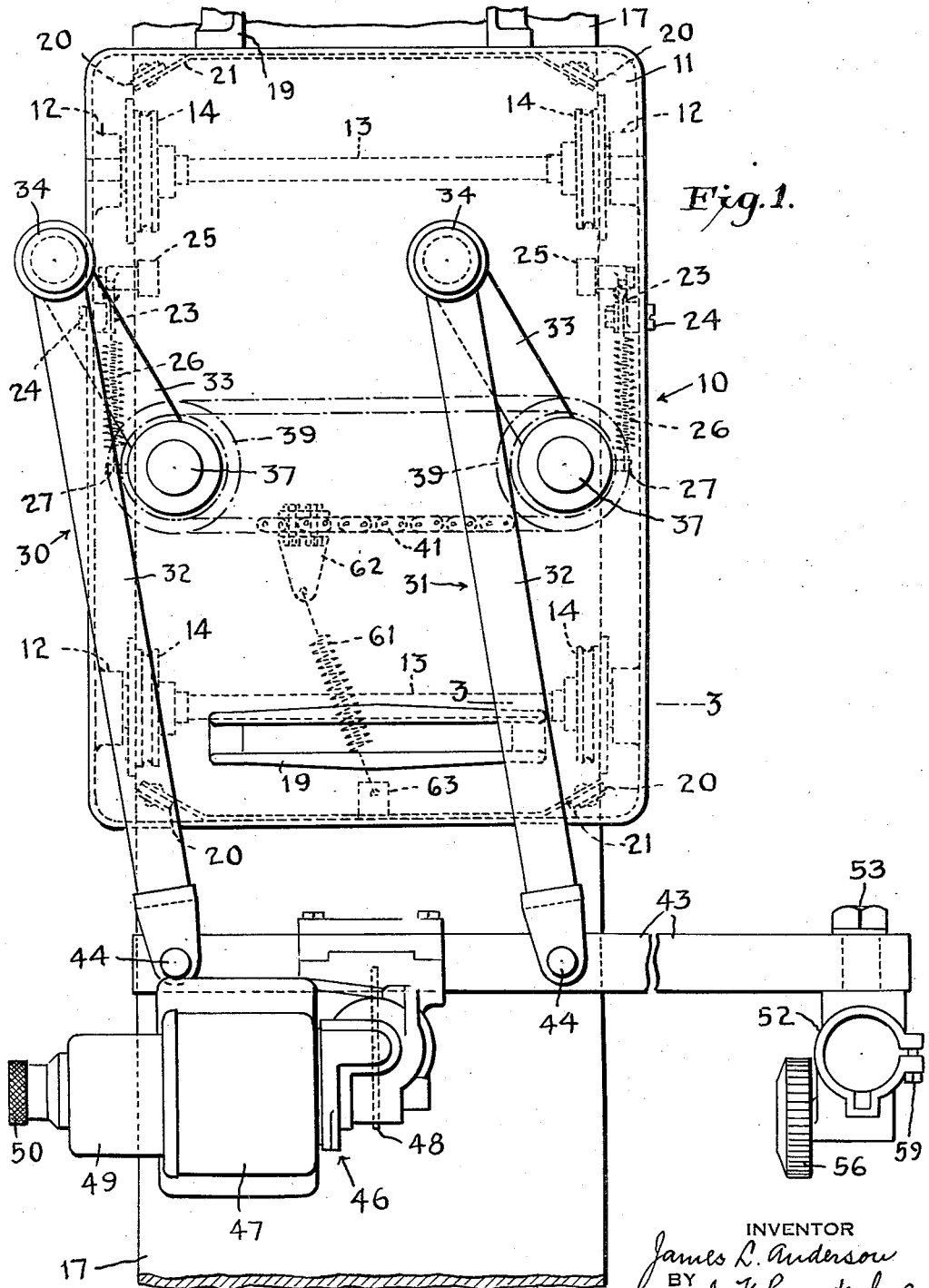

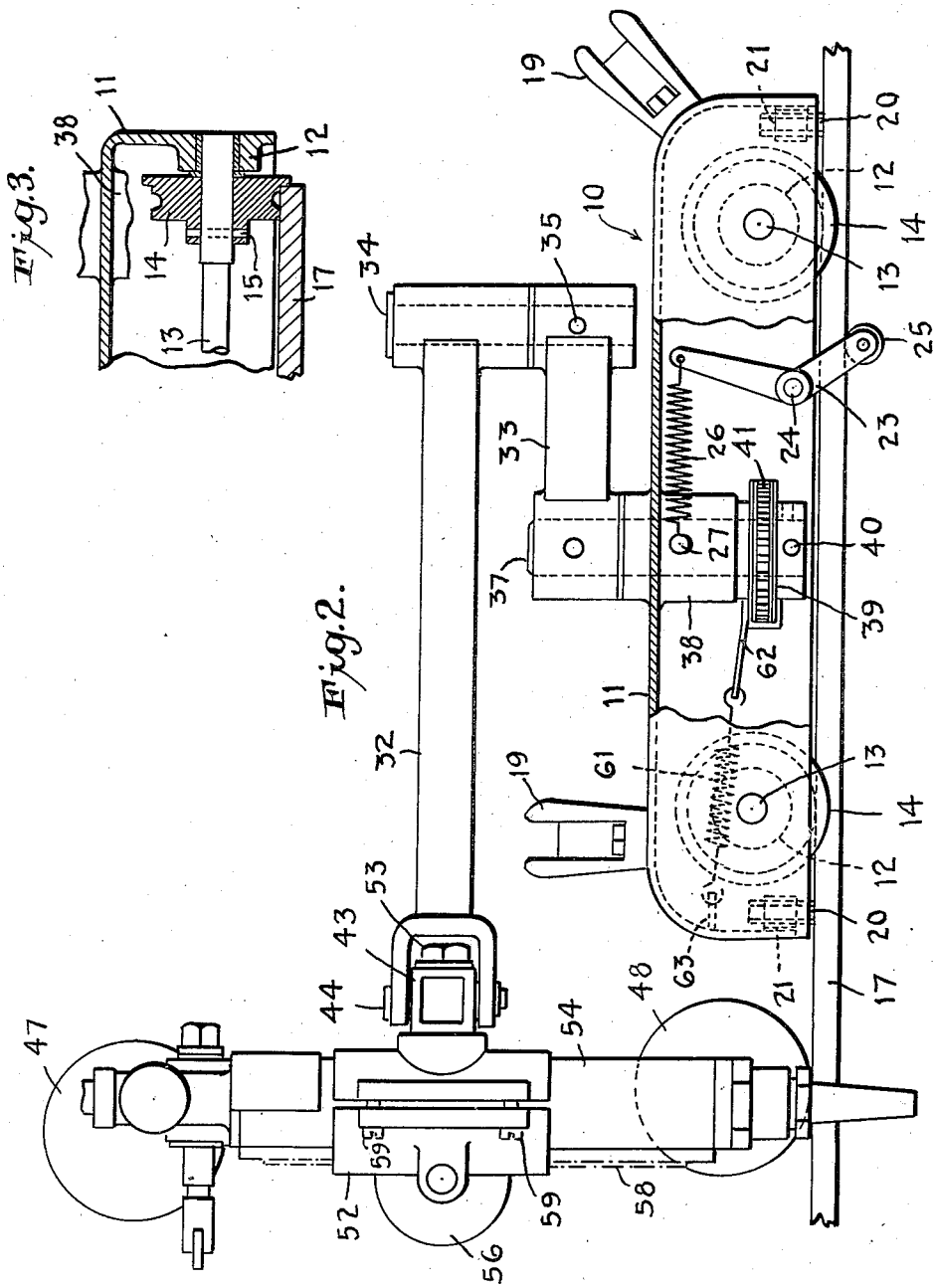

2,278,607

UNITED STATES PATENT OFFICE 2,278,607

UNIVERSAL TORCH MACHINE

James L. Anderson, Closter, N. J., assignor to Air Reduction Company, Incorporated, New York, N. Y., a corporation of New York Application May 7, 1940, Serial No. 333,720

9 Claims. (Cl. 266—23)

This invention relates to machines for moving a cutting torch or other thermal instrumentality in any and changing directions in a plane in accordance with the outline of a drawing, pattern, or other guide.

In universal torch machines that have a torch and tracer movable with respect to a supporting carriage that is itself movable to supply a component of the universal movement, or to increase the field of operation of the machine, the movement of the carriage is never at uniform speed when cutting irregular outlines. With the tracer and torch moving along one course the carriage may be stationary while a sharp right-angle turn to the next course may require that the carriage travel at the full tracer speed. Carriage friction can be reduced to a minimum by the use of ball bearings, but it is impossible to avoid the inertia loads incident to carriage acceleration.

It is an object of this invention to provide an improved universal torch machine, and a more specific object to reduce the inertia load on a tracing device in a universal torch machine that has a torch and tracer movably connected to a carriage that must be accelerated at times during a cutting operation.

The invention obtains reduced acceleration loads by connecting the tracer and torch to the carriage with a linkage that permits universal movement of the torch and tracer with respect to the carriage. Resilient means, such as a spring, that becomes effective as the universal linkage moves either way out of an intermediate range, causes the carriage to move with the tracer. This "resilient pick-up" of the carriage by the tracer spreads the carriage starting or speed increase over a longer period and thus decreases the acceleration.

Advantages of this invention are that larger machines can be operated by traction of the tracer; that for a machine of comparable size less tracer traction is necessary; and because of the reduced tracer traction requirement, a tracer that operates over a drawing can be operated with lighter pressure and less wear and tear on the drawing.

Other objects, features and advantages of the invention will appear or be pointed out as the specification proceeds.

In the accompanying drawings, forming a part hereof:

Fig. 1 is a top plan view, partly broken away, of a universal cutting machine embodying the invention.

Fig. 2 is a side elevation, partly broken away, of the machine shown in Fig. 1.

Fig. 3 is an enlarged, fragmentary, sectional view taken on the line 3—3 of Fig. 1.

A carriage 10 includes a box body casting or frame 11 with bosses 12 in which are journaled the ends of axles 13. There are two wheels 14 on each axle, and each wheel is preferably connected with the axle, as shown in Fig. 3, by a pin 15. All of the carriage wheels 14 are idler wheels, that is, they turn freely with their axles and have no connections with any operating mechanism. The wheels are flanged, but instead of running on rails they run on a flat supporting plate or table 17 and the wheel flanges bear against the edges of the table to prevent lateral displacement of the carriage.

The carriage 10 has handles 19 attached to the body casting 11. These handles 19 are used to move the carriage along its supporting table 17 and to lift the carriage when moving it to another table. Wipers 20, held by brackets 21 attached to the carriage, brush the surface of the table 17 ahead of the wheels 14 when the carriage moves in either direction. The wipers remove small obstructions that the wheels would otherwise run over. Such obstructions would lift the carriage slightly, causing a jolt of the cutting torch and consequent rough place in the cut.

An arm or bell-crank 23 is connected to each side of the carriage body 11 by a pivot 24, the axis of which extends substantially parallel to the table 17 and transverse of the direction of movement of the carriage. A roller 25 at the lower end of the bell-crank 23 projects under and is held against the bottom face of the table 17 by the tension of a spring 26 stretched between the upper end of the bell-crank 23 and a stud 27 which anchors the spring to the carriage body.

The rollers 25 on the arms 23 are guards to prevent the carriage 10 from being overturned. The tension of the spring 26 increases the pressure of both the rollers 25 and carriage wheels 14 against the table, with resulting increase in the friction that retards movement of the carriage. The tension of the spring 26 controls this friction and influences the intermittent movement of the carriage by the tracer as will be more fully explained hereinafter.

The carriage 10 supports a universal linkage that includes two jointed arms 30 and 31, each of which includes a forward link 32 and a rearward link 33 connected together by a pivot 34 that comprises the joint of the arm. This pivot 34 extends through a bearing in the rearward end of the forward link 32, and extends into an end portion of the link 33 in which the pivot 34 is fastened by a pin 35. The other end of each link 33 is pinned to a vertical shaft 37, which turns in a bearing 38 (Fig. 2) that is an integral part of the carriage body.

At the lower end of each shaft 37 a sprocket 39 has its hub fixed on the shaft by a pin 40 so that any angular movement of the link 33 causes the same angular movement of the sprocket 39. A sprocket chain 41, best shown in Fig. 1, passes around the sprockets 39 at the lower ends of both of the shafts 37 and holds the rearward links 33 always parallel to each other. The forward links 32 of the arms 30 and 31 are held parallel by a front bar 43 that is connected by pivots 44 between bifurcations at the forward ends of the links 32. The arms 30, 31, front bar 43, and chain 41 comprise a universal linkage of which the front bar 43 is the universally movable element.

The front bar 43 always moves parallel to itself. A tracer of the template-follower variety may be used to move the bar 43 in accordance with a predetermined outline. The illustrated embodiment of the invention has a tracer 46 clamped to the bar 43. The tracer 46 comprises a motor 47 and a traction wheel 48 that runs on the table 17 or on a pattern on the table. The traction wheel 48 can be steered by hand and is driven from the motor 47 through speed-reducing motion-transmitting means in a manner well understood in the art. The motor 47 is equipped with a centrifugal governor 49 that can be adjusted by a knob 50 to regulate the speed of the tracer wheel 48.

Other kinds of guiding devices, such as a magnetic template-follower, or any motor-driven pattern or template-follower capable of developing enough traction to pull the carriage 10 can be used in place of the tracer shown. The tracer 46 is merely representative of devices for guiding the front bar in accordance with the outline of a drawing or template and the term "tracer" is used in the description and claims in a broad sense to designate such a device.

A torch-holder 52 is attached to an extended end of the front bar 43 at one side of the pattern table 17. The torch-holder may be clamped on the front bar 43, but is preferably attached by a bolt that extends through the bar 43 and is held in position by a nut 53.

A thermal cutting instrumentality, such as an oxygen cutting torch 54, is held in the torch-holder 52 and is vertically adjustable by a wheel 56 that turns a pinion which meshes with a rack 58 attached to the side of the torch. The torch-holder is of the split clamp type and has clamping screws 59 that can be tightened or loosened to adjust the friction of the torch in the holder. This friction should be sufficient to hold the torch in any position in which it is set by the adjusting wheel 56. The invention can be changed into a welding machine by substituting a welding torch for the cutting torch, but the apparatus finds its greatest utility in the cutting field and is therefore described as a cutting machine.

As the tracer wheel 48 moves along a path over the table 17 the front bar 43 is moved parallel to itself with universal movement in a plane with respect to the carriage over a limited range. As the limit of that range is approached, the carriage 10 is moved and by this movement of the carriage the field of operation of the tracer can be extended throughout the length of the table minus an allowance for the length of the carriage 10. The torch 54 moves along a path of the same shape as that traversed by the tracer but over a field at one side of the table 17.

There is necessarily some inertia to be overcome in starting the carriage 10, and it is a feature of the invention that no matter what course the tracer wheel is following and no matter how suddenly the course may turn, it is never necessary to bring the carriage suddenly from very slow speed, or from rest, to tracer speed.

The gradual starting of the carriage 10 is accomplished by means of a spring 61 that is tensioned between a bracket 62 on the sprocket chain 40 and a lug 63 on the carriage body at the middle of the front wall of the carriage.

When the universal linkage is in such position that the front bar 43 can move substantially the same distance toward and away from the carriage 10 without requiring that the carriage move, the bracket 62 is in a middle position half-way between the sprockets 39. As the universal linkage moves with respect to the carriage 10, the bracket 62 is shifted to the right or left and tensions the spring 61.

As the tension of the spring 61 increases it eventually reaches a value which makes movement of the carriage 10 easier than further tensioning of the spring. The sprockets 39 are small enough so that the total lineal movement of the chain 41 and bracket 62 is less than the distance between the sprockets 39 while the universal linkage is moving from one end to the other of a desired range of movement of the linkage relative to the carriage. The spring 61 is so designed that the force required to shift or flex the linkage against the spring tension becomes greater than the force required to move the carriage 10 before the universal linkage reaches its limit of movement relative to the carriage.

This construction makes the tension spring 61 a factor in transmitting driving force from the traction wheel 48 to the carriage 10, and relieves the tracer of any heavy inertia loads such as would otherwise occur when the tracer, following a transverse course that required no carriage movement, turned a right angle and moved along a new course parallel to the edges of the table 17 and requiring the carriage to travel at the full lineal speed of the tracer.

The resilient carriage drive of this invention reduces the tractive effort that must be developed by the tracer and therefore in the case of tracers that follow the outline of a drawing requires less pressure of the tracer wheel on the drawing and increases the useful life of the drawing.

The preferred embodiment of the invention has been described, but changes and modifications can be made and some features of the invention can be used without others.

I claim:

1. A universal cutting machine including a wheeled carriage movable during a cutting operation, a torch-holder and a tracer, means supporting the torch-holder and tracer from the carriage for movement with respect to the carriage in any and changing directions in a plane, said means including connections between the torch-holder and tracer of such a nature that the torch-holder follows a path having the same shape as that followed by the tracer, and connections between the supporting means and the carriage including resilient means that reacts to cause driving force to be transmitted from the tracer to the carriage.

2. A universal torch machine including a carriage, a tracer, guide means by which the tracer moves a thermal instrumentality along a path like that followed by the tracer when the carriage is either stationary or in motion, connections supporting said guide means from the carriage, and other connections by which movement of the tracer is transmitted to the carriage, said other connections including a spring connected between the carriage and said guide means in position to resist movement of the guide means with respect to the carriage and adapted to yield to produce a gradual acceleration of the carriage.

3. In a universal cutting machine, a carriage, a tracer having a motor for imparting driving force to the tracer, a torch-holder, means connected with the carriage and supporting the tracer and torch-holder for universal movement in a plane with respect to the carriage, connections between the tracer and torch-holder of such a nature that the torch-holder follows a path having the same shape as that traveled by the tracer, and other connections including resilient means between the tracer and the carriage that reacts to cause driving force to be transmitted from the tracer to the carriage when the universal supporting means move beyond a given range with respect to the carriage.

4. In a universal cutting machine, a carriage supported on idler wheels, a tracer and a torch-holder and connecting means between them that cause the torch-holder to follow a path like that of the tracer including a connecting linkage between the carriage and the tracer and torch-holder, said connecting linkage having pivot connections constructed and arranged to give the tracer and torch-holder universal movement in a plane, and resilient means resisting movement of the linkage about one or more of said pivot connections and adapted to cause the carriage to move when the linkage moves beyond a given limit.

5. A universal cutting machine including a carriage that is movable along a support to increase the range of operation of the machine, a folding parallelogram linkage connected to the carriage for supporting a torch and tracer for movement with respect to the carriage in any and changing directions in a plane along similar paths, and a spring operatably connected with the carriage and the linkage in position to resist said movement with respect to the carriage of one or more of the links of said linkage so that the force of the tracer urging said movement of the linkage is transmitted to the carriage to move the carriage along its support.

6. In a universal cutting machine in which a carriage supports connections that are constructed and arranged to cause a torch and tracer to move along paths of the same shape, and the supporting carriage is moved intermittently by the tracer during a cutting operation, the improvement which comprises a resilient connection between the tracer and carriage for reducing the carriage acceleration load on the tracer.

7. In a universal cutting machine, a carriage supported on idler wheels, a tracer and a torch-holder and connecting means between them that cause the torch-holder to follow a path like that of the tracer including a connecting linkage between the carriage and the tracer and torch-holder, said connecting linkage having pivot connections constructed and arranged to give the tracer and torch-holder universal movement in a plane, resilient means resisting movement of the linkage about one or more of said pivot connections and adapted to cause the carriage to move when the linkage moves beyond a given limit, and means controlling the friction of the carriage to determine the range within which the linkage moves before the tracer movement is imparted to the carriage.

8. In a cutting machine, a carriage with idler wheels on which the carriage is movable along a stationary support, a torch-holder, a tracer, force-transmitting means between the tracer and carriage for imparting intermittent movement to the carriage, a linkage mounted on the carriage for supporting the tracer and torch-holder for universal movement in a plane with respect to the carriage and along like paths whether the carriage is stationary or in motion, an arm connected to the carriage and extending downward below the stationary support, a roller carried by said arm and projecting under said support to prevent overturning of the carriage, and a spring holding the roller against the under side of the support to control the friction that retards movement of the carriage.

9. A universal cutting machine including a carriage comprising a box body with idler wheels that run on a stationary support, two parallel, vertically extending shafts rotatable in spaced-apart bearings in the carriage, a jointed arm with its rearward link carried by the upper end of each shaft, a sprocket secured to the lower end of each shaft within the body of the carriage, a chain connecting the sprockets so that they turn together and maintain the rearward links of the jointed arms in parallel relation, a front bar pivoted to the forward ends of the jointed arms and holding the forward links of said arms parallel, a tracer connected to the front bar between the jointed arms, a torch-holder connected to an extending end portion of the front bar outside of the jointed arms, and a spring connected between the carriage body and a section of the chain midway between the sprockets when the jointed arms are in substantially a middle position of their range of movement with respect to the carriage, the sprockets being of a diameter that is correlated with the desired range of angular movement of the rearward links of the jointed arms so that such angular movement will occur before the spring connection to the chain travels beyond a given range.

JAMES L. ANDERSON.